(12) United States Patent
Yokomizo

(10) Patent No.: US 6,736,230 B2
(45) Date of Patent: May 18, 2004

(54) MOTORCYCLE FRAME ASSEMBLY

(75) Inventor: Shin Yokomizo, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 4 days.

(21) Appl. No.: 10/163,400

(22) Filed: Jun. 5, 2002

(65) Prior Publication Data

US 2003/0006580 A1 Jan. 9, 2003

(30) Foreign Application Priority Data

Jun. 8, 2001 (JP) .......................................... 2001-173832

(51) Int. Cl.$^7$ ................................................ B62D 61/02
(52) U.S. Cl. ........................................ 180/219; 280/274
(58) Field of Search ............................... 180/219, 227; 280/274, 281.1, 781, 796, 798

(56) References Cited

U.S. PATENT DOCUMENTS

| | | | | |
|---|---|---|---|---|
| 4,437,679 A | * | 3/1984 | Campagnolo | 280/281.1 |
| 4,484,756 A | * | 11/1984 | Takamiya et al. | 280/281.1 |
| 4,531,755 A | * | 7/1985 | Isono et al. | 280/277 |
| 4,660,854 A | | 4/1987 | Suzuki et al. | |
| 4,781,264 A | * | 11/1988 | Matsuzaki et al. | 180/219 |
| 4,856,801 A | * | 8/1989 | Hollingsworth | 280/284 |
| 5,607,064 A | * | 3/1997 | Fourel | 211/5 |
| 5,845,728 A | | 12/1998 | Itoh et al. | |
| 5,921,339 A | | 7/1999 | Matsuura | |
| 6,478,105 B2 | * | 11/2002 | Okuma | 180/219 |

FOREIGN PATENT DOCUMENTS

JP 07-276719 4/1997

* cited by examiner

*Primary Examiner*—Daniel G. DePumpo
(74) *Attorney, Agent, or Firm*—Knobbe, Martens, Olson & Bear, LLP

(57) ABSTRACT

A motorcycle frame assembly arranged to have a desirable amount of rigidity in both transverse and vertical directions. The frame assembly desirably includes a head pipe configured to support a front wheel and associated suspension assembly. A main tube and down tube extend in a rearward direction from the head pipe. Desirably, the main tube is elliptical in cross-section, with the longer dimension being arranged generally horizontally and the shorter dimension being arranged generally vertically. Preferably, the main tube is arcuate along its length and defines a convex outer surface portion opposing a concave outer surface portion. Preferably, the main tube is arranged such that the convex outer surface portion faces the down tube. Desirably, the main tube also extends from the head pipe such that the main tube is lower than perpendicular with respect to the head pipe.

13 Claims, 6 Drawing Sheets

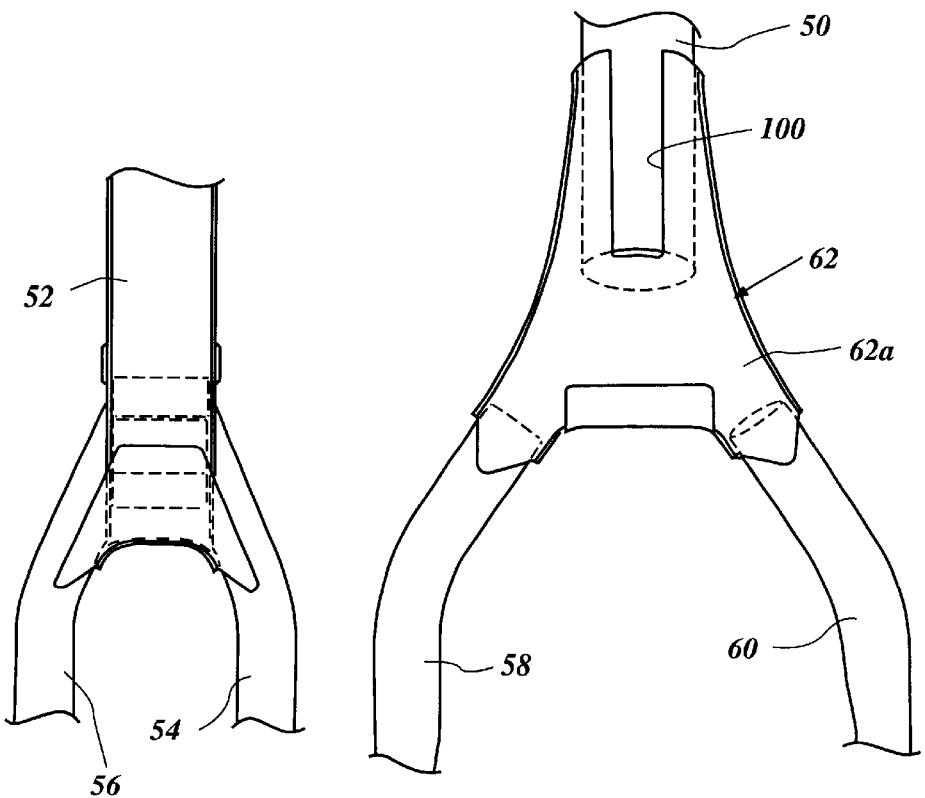
*Figure 3(a)*
*Figure 3(b)*
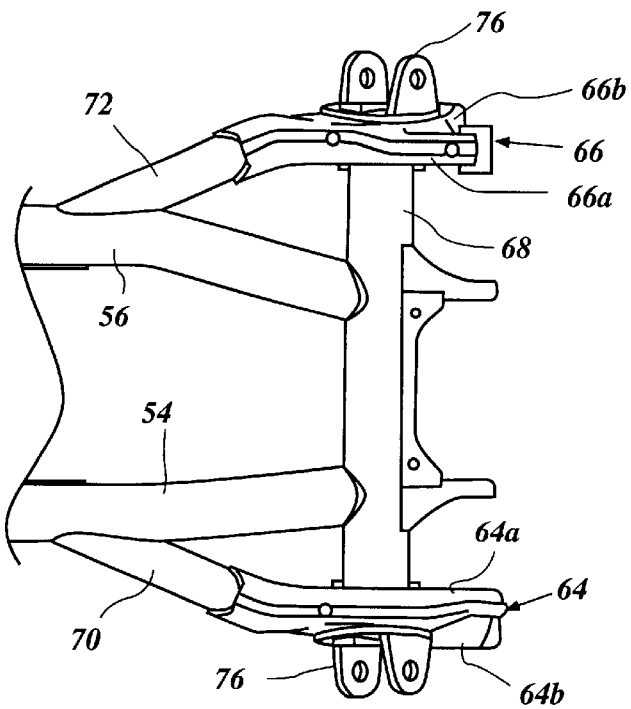
*Figure 3(c)*

MOTORCYCLE FRAME ASSEMBLY

PRIORITY INFORMATION

This application is related to, and claims priority from, Japanese Patent Application No. 2001-173832, filed on Jun. 8, 2001, the entirety of which is incorporated by reference herein.

BACKGROUND OF THE INVENTION

1. Field of the Invention

The present invention relates generally to motorcycle frame assemblies and, more particularly, to an improved motorcycle frame assembly that achieves a desirable balance between rigidity in a lateral direction and rigidity in a vertical direction.

2. Description of the Related Art

As is well known, motorcycles generally include a frame assembly that is made up of a plurality of individual tubes welded together. The typical frame construction includes a head pipe at a front end of the frame, which desirably supports the front wheel via a steerable front fork assembly. One or more main tubes typically extend generally rearwardly from the head pipe. The main tubes may bend downward over a rear portion of an engine that is positioned generally below the main tubes. In addition, one or more down tubes are typically affixed at their forward ends to the head pipe at a location lower than the main tubes. The down tubes extend downwardly and rearwardly from the head pipe. The rear ends of the main tube and the down tubes generally are joined, frequently by a pair of seat rails and bracket assemblies. One of the bracket assemblies typically provides support for the rear wheel suspension swing arm assembly. Although the arrangement of the individual frame members may vary, the above-described construction is generally the type utilized for motorcycles in general and off-road motorcycles in particular.

In off-road motorcycles, it is often desirable for the motorcycle frame to possess differing levels of rigidity in the lateral direction and the vertical direction. This is due, at least in part, to an off-road motorcycle being subjected to forces occurring from both cornering and jumping.

In the case of lateral loads, rigidity is desired to improve stability during cornering at high speeds or over rough terrain. In the case of the vertical loads, the motorcycle may land from considerable heights, which causes large shock loads to be applied to the frame. If the frame is too rigid, the shock loads are largely transferred to the rider. If the frame is not rigid enough, the frame may elastically deform or break.

U.S. Pat. No. 5,845,728, issued to Hiroyuki Itoh et al. on Dec. 8, 1998, describes several embodiments intended to increase the transverse rigidity of a motorcycle frame while not overly increasing the vertical rigidity of the motorcycle frame. The disclosed embodiments feature main tubes that feature flat upper and lower faces. Thus, in some embodiments, the main tube is rectangular with a larger lateral dimension than a vertical dimension. In the arrangement shown in FIG. 12 of the '728 patent, the main pipe is disclosed as having an elliptical cross-section with flat upper and lower surfaces that facilitate attaching components of the motorcycle to the frame and rounded side walls that supposedly enable a characteristic design. It is clear from this description and the cross-section shown in FIG. 13 that the main pipe is oval and not elliptical in shape.

SUMMARY OF THE INVENTION

The oval shape and the rectangular shape of the main pipe in the '728 patent increase the transverse rigidity of the frame assembly while not overly increasing the vertical rigidity of the frame assembly. The disclosed shapes, however, each feature a stress-rising construction. In the case of the rectangle, the corner at which two perpendicular faces meet defines a distinct stress-riser. In the case of the oval, the rather abrupt change in curvature defined between the flat upper and lower surfaces and the curved side faces also defines a stress-riser. In order to adequately compensate for the stress-risers in an off-road motorcycle frame, the main pipe diameter would need to be greatly increased. The increase in diameter, however, approximates a circular design, which suffers from being too rigid vertically when adequately rigid laterally.

Accordingly, preferred embodiments of the present motorcycle frame assembly include a main tube that, in section, is non-circular but continuously curved with a lateral dimension that is larger than the vertical dimension. Such an arrangement advantageously provides lateral rigidity while permitting at least a small amount of compliance in the vertical direction. In addition, desirably the main tube curves downwardly from the front end toward the center of the main tube and curves upwardly from the center toward the rearward end of the main tube. With such an arrangement, the ability of the main tube to experience elastic deformation in response to vertical loads is increased in comparison to main tube that is linear. As a result, the motorcycle frame exhibits exceptional lateral rigidity to improve handling, while providing an advantageous amount of vertical compliance to improve the comfort of the rider.

An aspect of the present invention involves an off-road motorcycle comprising a frame assembly. The frame assembly includes a head pipe, a main tube and a down tube. The main tube and the down tube extend in a generally rearward direction from the head pipe and the main tube is positioned above the down tube. A front suspension assembly is rotatably supported by the head pipe and rotatably supports a front wheel. A rear suspension assembly is pivotably supported by the frame assembly and rotatably supports a rear wheel. An internal combustion engine is supported by the frame assembly and is configured to drive the rear wheel. The main tube defines a first cross-sectional dimension in a first direction substantially aligned with a vertical, center plane of the motorcycle and a second cross-sectional dimension in a second direction substantially normal to the first direction. The second dimension is greater than the first dimension. The main tube is nonlinear along its length and defines a center axis extending from a forward end of the main tube to a rearward end of the main tube. A center portion of the center axis is spaced below a straight line extending between the forward end and the rearward end of the axis.

Another aspect of the present invention involves a motorcycle frame assembly comprising a head pipe, a main tube and a down tube. The main tube and the down tube extend in a generally rearward direction from the head pipe. The main tube is positioned above the down tube. The main tube defines a first cross-sectional dimension in a longitudinal vertical plane of the motorcycle and a second cross-sectional dimension in a second direction substantially normal to the first direction. The second dimension is greater than the first dimension and the main tube has a noncircular continuously curved cross-section along at least a portion of the main tube.

A further aspect of the present invention involves a motorcycle frame assembly comprising a head pipe, a main tube, a down tube and a seat rail. The main tube and the down tube extend in a generally rearward direction from the head pipe. The main tube is positioned above the down tube and the seat rail extends between rearward ends of the main tube and down tube. The main tube, down tube and seat rail are arranged in a generally triangular configuration and define a generally triangular internal space therebetween. The main tube defines a first cross-sectional dimension in a first direction. The first direction is substantially aligned with a vertical, center plane of the motorcycle. A second cross-sectional dimension is defined by the main tube in a second direction substantially normal to the first direction. The second dimension is greater than the first dimension. The main tube is arcuate along its length such that the main tube defines a convex outer surface portion opposing a concave outer surface portion. The main tube is arranged such that the convex outer surface generally faces the internal space.

BRIEF DESCRIPTION OF THE DRAWINGS

These and other features, aspects and advantages of the present invention are described with reference to the drawings of a preferred embodiment, which embodiment is intended to illustrate and not to limit the present invention. The drawings comprise six figures.

FIG. 3a is a plan view of the down tube assembly, which includes an upper down tube connected to a pair of lower down tubes, or engine cradle tubes.

FIG. 3b is a top plan view of a junction between a rearward end of the main tube and the pair of seat rails. A lug connects the rearward end of the main tube to upper ends of the seat rails.

FIG. 3c is a top plan view of a junction between the lower down tubes and the seat rails of the frame assembly.

DETAILED DESCRIPTION OF THE PREFERRED EMBODIMENT

Figure 1:
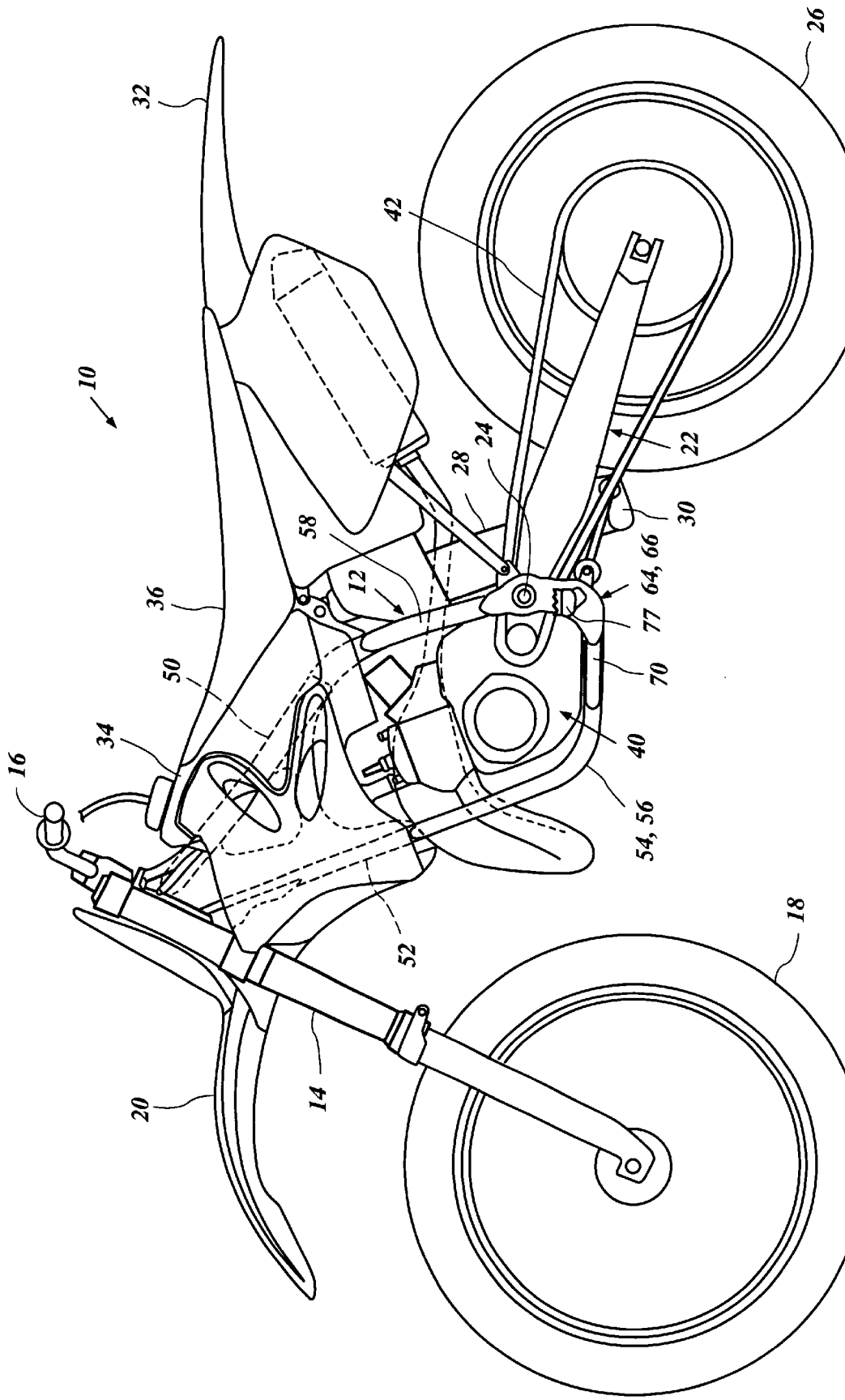
FIG. 1 is a side elevational view of an off-road motorcycle incorporating a preferred frame assembly.

With reference to FIG. 1, an off-road motorcycle incorporating a preferred frame assembly is identified generally by the reference numeral 10. The motorcycle 10 includes a frame assembly, indicated generally by the reference numeral 12. The frame assembly preferably is of the semi-double cradle type. Other arrangements also can be used; however, the semi-double cradle type increases the protection of the engine, which is very desirable in off-road motorcycles. The frame assembly 12 is formed primarily from tubular members, which may have round, square or other suitable cross-sectional configurations. The construction of the frame 12 is described in greater detail below with reference to FIGS. 2–6.

A front fork assembly 14 is journaled for rotation with respect to the frame assembly 12. The front fork assembly 14 preferably is of the telescopic type. A handlebar assembly 16 is carried at an upper end of the front fork 14 for steering of a front wheel 18, which is rotatably journaled at a lower end of the fork 14, as is well known in the art. The front fork assembly 14 also supports a front fender 20 at a position above the front wheel 18. The front fender 20 typically is arranged to deflect dirt, mud or other debris that may be thrown upward by the front wheel 18.

A swing arm assembly 22 is pivotally supported by a lower, rearward portion of the frame assembly 12 at a pivot axis 24. At its rearward end, the swing arm 22 supports a rear wheel 26 of the motorcycle 10. A rear shock absorber 28 is operably connected between the frame assembly 12 and the rear swing arm 22. Preferably, the rear shock absorber 28 is connected to the swing arm 22 through a link 30, as is known in the art. Thus, the rear shock absorber 28 provides some resistance to articulating movement of the swing arm 22 and the rear wheel 26 relative to the frame assembly 12. The link 30 may be utilized to alter a leverage ratio between the rear wheel 26 and the rear shock absorber 28. Alternatively, the rear shock absorber 28 may be connected directly to the swing arm 22.

The frame 12 also supports a rear fender 32 at a position above the rear wheel 26. The rear fender 32 is arranged to deflect mud, dirt or other objects which may be thrown in an upward direction by the rear wheel 26.

A fuel tank 34 is supported by the frame 12 in a position generally behind and below the handlebar assembly 16. Desirably, the fuel tank 34 surrounds at least a portion of the frame 12 to lower the center of gravity of the motorcycle 10.

A straddle-type seat assembly 36 generally is positioned between the fuel tank 34 and the rear fender 32. Desirably, the seat assembly 36 has a relatively flat upper surface and is thicker in a center portion in comparison with either the front or rear end portions. Such an arrangement permits a rider of the motorcycle 10 to move relatively freely between various positions with respect to the seat assembly 36.

An internal combustion engine, indicated generally by the reference numeral 40, is supported by the frame assembly 12. Preferably, the engine 40 is positioned below the fuel tank 34 and seat assembly 36 to provide the motorcycle 10 with a relatively low center of gravity, which improves handling.

The illustrated engine 40 operates on a 2-stroke, crankcase compression principle and is of a single cylinder arrangement. However, other suitable engine arrangements may also be used, such as a multi-cylinder arrangement, or engines operating on other operating principles, such as a 4-stroke engine, for example. In addition, the engine can be liquid cooled in some arrangements.

A chain and sprocket drive assembly 42 extends between the engine 40 and the rear wheel 26 and is configured to transfer torque produced by the engine 40 to the rear wheel 26 to propel the motorcycle 10 in any suitable manner. Although a chain and sprocket type drive assembly 42 is illustrated, other suitable types of drive arrangements may also be used, such as a belt drive or a shaft drive arrangement, for example.

Figure 2:
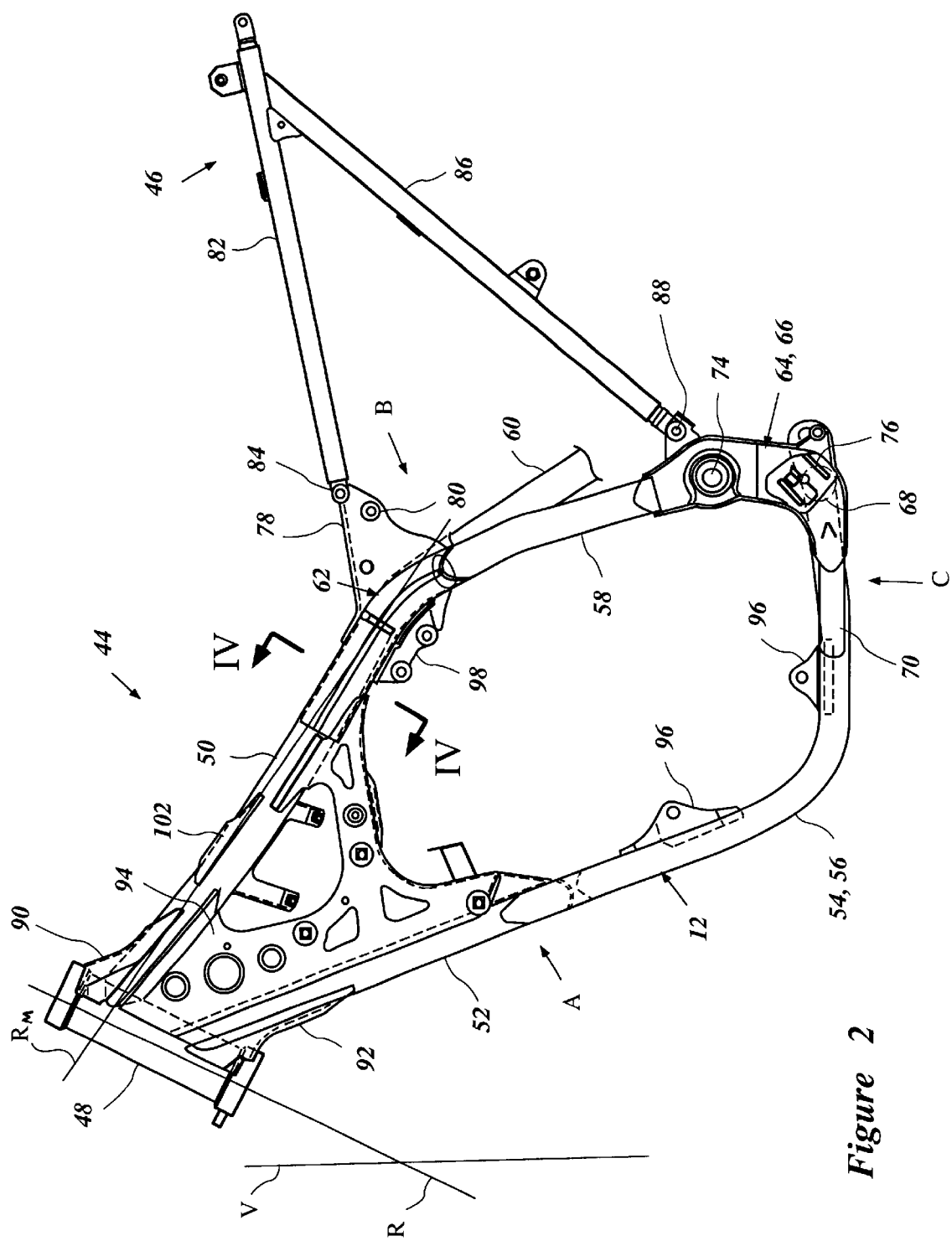
FIG. 2 is a side elevational view of the frame assembly of the motorcycle of FIG. 1. The frame includes a head pipe, a main tube, a down tube assembly, and a pair of seat rails.

With reference to FIG. 2, the frame 12 is illustrated with the other components of the motorcycle 10 removed. The frame assembly 12 is constructed primarily of a main frame portion 44 and a subframe portion 46. Desirably, the main frame portion 44 supports the engine 40, the front fork assembly (which also includes front suspension components) 14, the rear shock absorber 28 and the rear swing arm 22. The subframe 46 is connected to the main frame 44 and generally supports the seat 36 and rear fender 32. As is known in the art, the individual tubes that comprise the frame 12 are typically welded together. However, other suitable construction methods may also be used.

The main frame 44 desirably includes a head pipe 48, which is located generally toward a front, upper portion of the main frame 44. The head pipe 48 rotatably supports the front fork assembly 14 and may be inclined with respect to vertical to support the front fork assembly 14 at a desired rake angle with respect to vertical. In other words, a central axis R extending through the head pipe 48 extends at a suitable angle relative to a vertical axis V. The angle between these axes R, V helps to determine the rake angle of the front fork assembly 14.

A main tube 50 extends rearwardly from an upper portion of the head pipe 48. In addition, desirably a main body portion of the main tube 50 extends in a generally downward direction relative to a horizontal axis. The main tube 50 will be described in greater detail below.

A down tube assembly extends generally downwardly and rearwardly from a lower portion of the head pipe 48 and includes an upper down tube portion 52 and a lower down tube portion. The upper down tube portion 52 preferably is formed of a square or rectangular member that is welded or otherwise suitably secured to the head pipe 48. In the illustrated arrangement, the upper down tube portion 52 is formed of a rectangular pipe having a larger transverse dimension than a vertical dimension such that the larger two faces of the pipe extend in a generally transverse direction. The lower down tube portion preferably is comprised of a pair of lower down tube members 54, 56. The lower down tube members 54, 56 preferably are circular in cross-section although other shapes can be used, such as square, rectangular, elliptical or oval, for instance.

With additional reference to FIG. 3a, desirably, the lower down tube members 54, 56 extend in a generally lateral direction with respect to a central plane Cp of the motorcycle 10 from a lower end of the upper down tube 52. The square or rectangular cross-section of the upper down tube portion 52 facilitates coupling of the lower down tube members 54, 56 to the upper down tube portion 52. The lower down tube members 54, 56 extend rearward in a spaced apart orientation along a direction substantially aligned with the upper down tube portion 52. At a lower end of the frame 12, the lower down tubes members 54, 56 curve and extend rearwardly to support a lower portion of the engine 40. Thus, the lower down tube members 54, 56 extend from a forward side of the engine to a lower side of the engine 40 in a cradle-type frame arrangement.

A pair of seat pillar tubes 58, 60 are connected to a rearward end of the main tube 50 by a lug 62. The lug 62 preferably is formed by overlapping and welding together a plate-like component on both the upper side and the lower side, as will be described. These plate-like components sandwich portions of each of the main tube 50 and the two seat pillar tubes 58, 60. Preferably, the plate-like components are formed by a press-forming operation or forging.

With additional reference to FIG. 3b, the seat pillar tubes 58, 60 extend in opposing lateral directions from the main tube 50. Lower ends of the seat pillar tubes 58, 60 are connected to respective upper ends of a pair of swing arm mount brackets 64, 66, which are spaced apart from one another in a lateral direction approximately the width of the engine 40.

With continued reference to FIG. 3c, a cross tube 68 extends between the pair of brackets 64, 66 to secure the brackets 64, 66 in a spaced apart relationship. A pair of tube members 70, 72 extend from respective lower ends of the brackets 64, 66 in a forward direction and connect to the lower, horizontal portions of the lower down tube members 54, 56. In addition, rearward ends of the lower down tubes 54, 56 terminate at, and are connected to, the cross tube 68.

Desirably, the bracket 64 includes an inner bracket portion 64a and an outer bracket portion 64b connected to one another and receiving a lower end of the seat rail 58 and a rearward end of the support tube 70 therebetween. Similarly, the bracket 66 includes an inner bracket portion 66a and an outer bracket portion 66b connected together and securing the seat rail 60 and support tube 72 therebetween. Preferably, the rear arm brackets 64, 66 are formed by overlapping and welding a pair of plate-like components that have been press-formed or forged.

The brackets 64, 66 define an aperture 74 for receiving a swing arm support shaft (not shown), which pivotally supports the swing arm 22 in any suitable manner. In addition, a pair of foot peg mounts 76 are located on the brackets 64, 66. The foot peg mounts 76 are configured to support a pair of foot pegs 77 (see FIG. 1) on which a rider of the motorcycle 10 may place his or her feet.

With reference to FIG. 2, a shock mount bracket 78 preferably is connected to the main frame 44 at a position near the junction between the main tube 50 and the seat rails 58, 60. More preferably, the shock mount bracket 78 is connected to the lug 62. Even more preferably, the shock mount bracket 78 is connected to an upper portion of a rear end of the lug 62 while an upper engine mount is secured to a lower portion of the lug 62. The shock mount bracket 78 extends generally in a rearward direction from the main frame 44 and defines a boss 80 for mounting an upper end of the rear shock absorber 28. Any suitable shock mount construction can be used.

Desirably, an upper portion, or seat rail 82, of the sub frame 46 is connected to the shock mount bracket 78 by a fastener, such as bolt 84. A stay portion 86 of the subframe 46 is connected to the brackets 64, 66 by a fastener, such as bolt 88, and extends upwardly to connect to a rearward portion of the seat rail 82. Thus, the stay 86 supports the rearward portion of the seat rail 82.

With reference still to FIG. 2, a gusset arrangement preferably reinforces the connection between the main tube 50, the down tube 52 and the head pipe 48. For example, an upper gusset 90 extends from an upper end of the head pipe 48 and is connected to an upper surface of the main tube 50. Similarly, a lower gusset 92 extends from a lower end of the head pipe 48 and is connected to a lower surface of the down tube 52. An intermediate gusset 94 extends rearward from the head pipe 48 at a position between the main tube 50 and the down tube 52 and is connected to both the main tube 50 and the down tube 52. Desirably, the intermediate gusset 94 is substantially larger than either of the upper or lower gussets 90, 92.

Preferably, the frame 12 includes a plurality of engine mounts configured to secure the engine 40 to the frame 12. For example, a pair of lower engine mounts 96 are fixed to the lower down tube 54. Although not shown, an additional pair of engine mounts 96 desirably are affixed to the lower down tube 56 in a similar manner. In addition, an upper engine mount 98 is desirably fixed to the lug 62, which connects the main tube 50 to the seat rails 58, 60. The engine 40 may be mounted directly to the brackets 96, 98 or an additional connection member may extend between one or more of the mount brackets 96, 98 and the engine 40.

Figure 4:
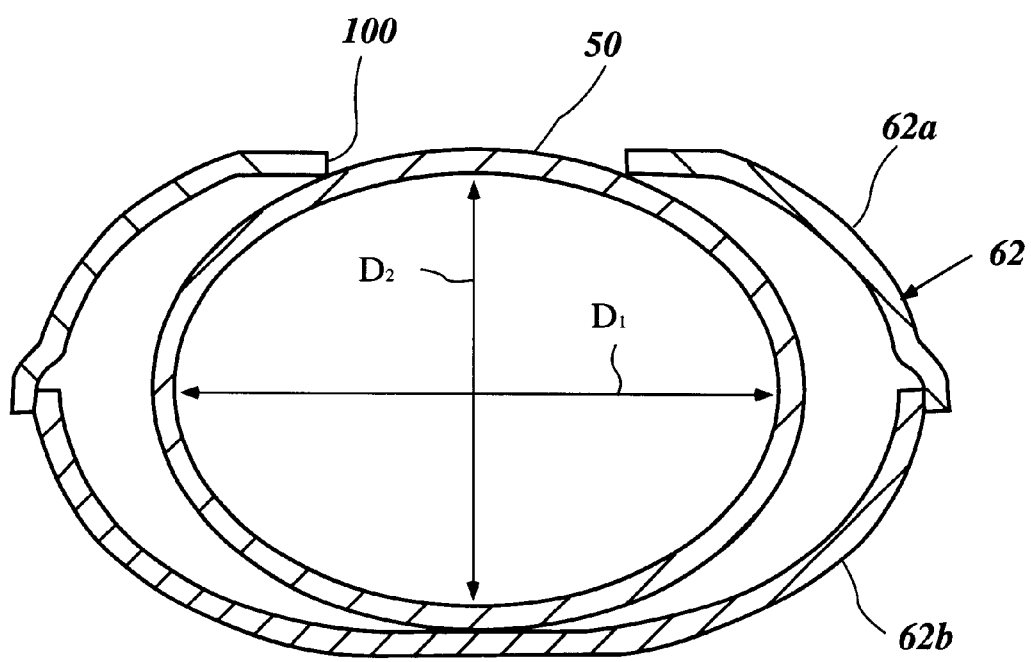
FIG. 4 is a cross-sectional view taken along the view line 4—4 of FIG. 3 showing a rearward portion of the main tube and the lug connecting the main tube to the seat rails. The lug includes an upper lug portion connected to a lower lug portion.

With reference to FIG. 4, the main tube 50 and the lug 62 are shown in section. As illustrated, the main tube 50 is desirably elliptical in cross-section with the major axis being arranged generally horizontally. As is known, an ellipse is mathematically a closed curve that is generated by a point moving in such a way that the sums of its distances from two fixed points is a constant. In one preferred construction, the cross-section of the main tube 50 is a non-circular continuously curved shape. For instance, the cross-section does not have a planar side that meets with a curved side. By reducing or completely removing sudden changes in curvature (such as at a corner between two perpendicular surfaces or an intersection between a straight line and a radius), the structural integrity of the main pipe 50 is less compromised by stress-risers that can be found at the sudden changes in curvature.

In the illustrated arrangement, the main tube 50 defines a first diameter D1 in a horizontal, or lateral direction, and a second diameter D2 in a vertical direction or, a direction generally parallel with a central vertical plane Cp of the motorcycle 10. Desirably, the diameter D1 is larger than the diameter D2. With such an arrangement, lateral rigidity of the main tube 50, and thus the frame 12, is increased while also increasing vertical compliance of the main tube 50 and, thus, the frame 12. As a result, the motorcycle 10 utilizing a preferred frame 12 exhibits exceptional handling due to the increased lateral rigidity and is also comfortable for the rider due to the increased vertical compliance.

As also illustrated in FIG. 4, desirably, the lug 62 includes an upper lug portion 62a and a lower lug portion 62b connected to one another through any suitable means, such as welding, for example. The upper and lower portions 62a, 62b of the lug 62 secure a rearward end of the main tube 50 and upper ends of the seat rails 58, 60 therebetween.

With additional reference to FIG. 3b, the upper portion 62a of the lug 62 desirably includes a cut-out portion, or channel 100, along a portion of the upper surface of the main tube 50. The channel 100 prevents the lug 62 from inhibiting bending of the main tube 50 along a horizontal axis and thereby substantially avoids negatively impacting the vertical compliance of the main tube 50. Preferably, as illustrated, the channel 100 extends beyond the rearward end of the main tube 50.

With reference to FIG. 2, desirably, the main tube 50 is arcuate along its length. That is, the main tube 50 is preferably non-linear and, more preferably, has a constant curvature such that a center portion of the tube 50 is disposed lower than the end portions (i.e., toward the down tube 52) relative to a straight line $R_M$ extending between the ends of the main tube 50. The curvature of the main tube 50 results in one-half of the main tube 50 defining a convex outer surface and the opposing one-half defining a concave outer surface. Desirably, the convex outer surface of the main tube 50 faces a generally triangular interior space defined by the main frame 44. Advantageously, the curvature of the main tube 50 permits greater elastic deformation, or flexing, of the tube 50 when a load is applied to one or both ends. Accordingly, the fatigue life of the main tube 50 is increased in comparison with frames utilizing a straight, or linear, main tube.

During operation of the motorcycle, the loads applied to the frame, through the wheels 18, 24 and suspension members 14, 28, are absorbed primarily by the main tube 50. Accordingly, the curved main tube 50 increases the fatigue life of the entire frame assembly 12. Further, in combination with the elliptical cross-section, the curved main tube 50 enhances the vertical compliance of the frame assembly 12. Accordingly, less force is transmitted to the rider when the motorcycle 10 is subjected to a large impact in comparison with prior frame designs utilizing linear main tubes having a circular cross-section.

The curved main tube 50 also permits ergonomic benefits to be achieved. For example, because of the curvature of the main tube 50, the fuel tank 34 may be mounted lower thereby lowering the overall center of gravity of the motorcycle 10. Lowering the fuel tank 34 even a small distance produces a large improvement to the handling characteristics of the motorcycle 10, due to the weight of the fuel and its tendency to shift in response to movements of the motorcycle 10. In addition, because the fuel tank is lowered, the portion of the seat 36 above the fuel tank 34 may be thicker without an increase in height. Accordingly, more padding can be provided in this location to increase comfort for the rider of the motorcycle 10.

Figure 5:
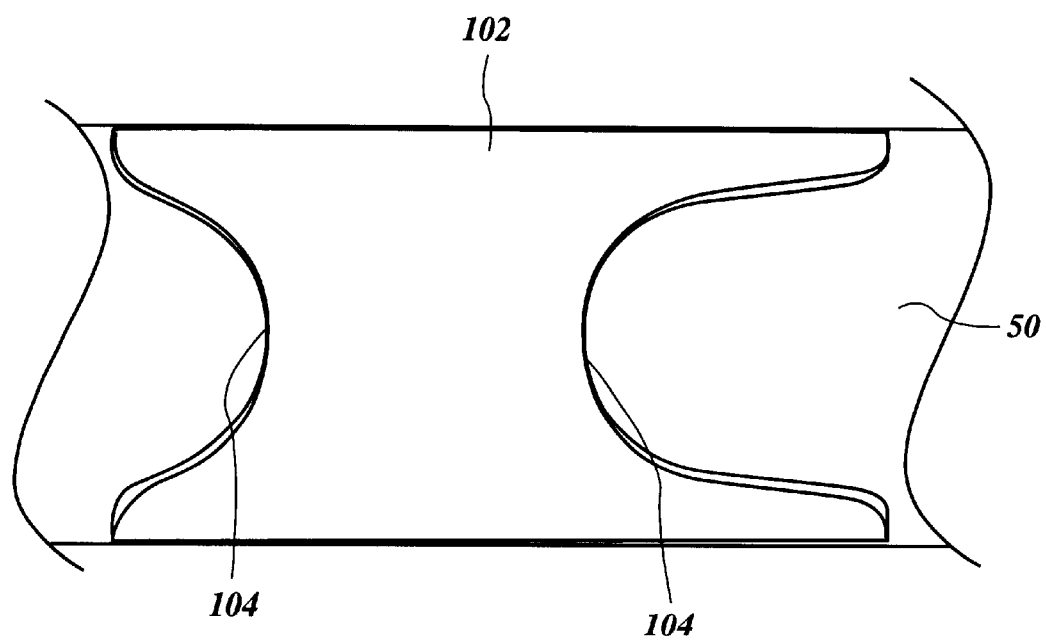
FIG. 5 is a top plan view of a central portion of the main tube illustrating a reinforcement bracket connected to an upper surface of the main tube.

With additional reference to FIG. 5, desirably a reinforcement bracket 102 is attached to a central portion of the main tube 50. Preferably, the bracket 102 is mounted to an upper surface of the main tube 50 and extends around a portion of the circumference of the tube 50. In the illustrated arrangement, the bracket 102 extends slightly less than halfway around the circumference of the tube 50. In one preferred arrangement, the bracket is mounted at the location in which the main tube 50 is bowed downward such that the main tube 50 can be reinforced in the central portion of this bend region.

The bracket 102 includes a pair of cut-out portions 104, substantially aligned with an axis of the main tube 50. In the illustrated arrangement, the cut-out portions 104 open at forward and rearward ends of the bracket 102, respectively, and extend to a rounded end portion. However, the bracket 102 may take on other suitable arrangements.

Advantageously, the bracket 102 is configured to reinforce the strength of the main tube 50 in response to bending or torsional loads. In addition, the cut-out portions 104 permit the main tube 50 to flex, despite the presence of the bracket 102. Thus, the bracket 102 allows some flexion while not allowing too much flexion such that the main tube 50 can be elastically deformed or broken. Accordingly, the size and shape of the cut-out portions 104 may be altered, along with the cross-sectional shape and curvature of the main tube 50, to achieve a desirable balance between lateral rigidity, vertical compliance and overall strength of the frame assembly 12. For instance, the cut-out portions can be V-shaped, circular, or irregular in configuration.

Figure 6:
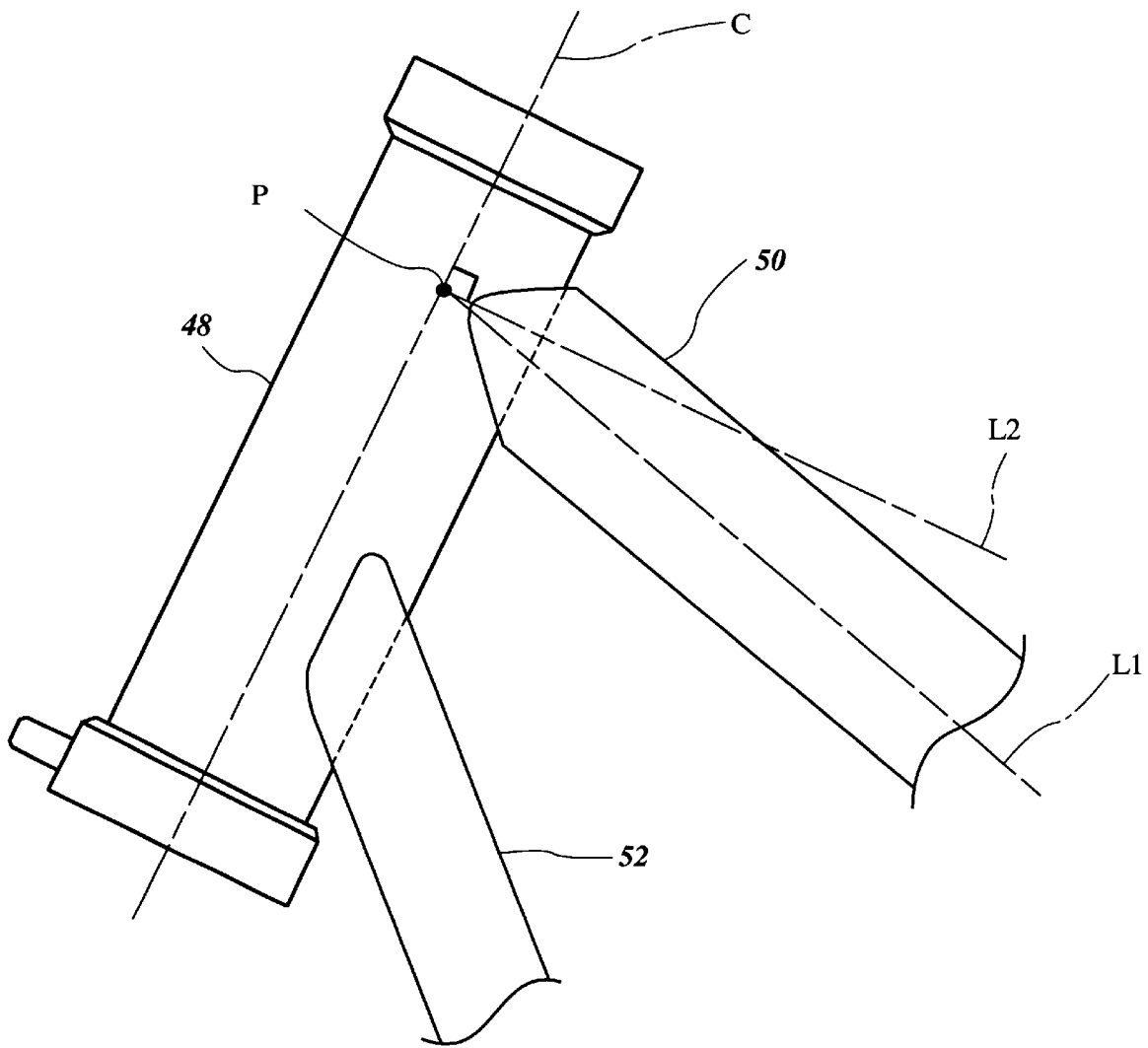
FIG. 6 is a side plan view of the head pipe and forward ends of the main tube and down tube.

With reference to FIG. 6, an axis L1 of the main tube 50 intersects with an axis C of the head pipe 48 at a point P. Desirably, the main tube 50 extends in a rearward direction from the head pipe 48 such that the axis L1 is disposed below (i.e., toward the down tube 52) an imaginary line L2 extending from the point P and being perpendicular to the axis C of the head pipe 48. In the illustrated arrangement, the main tube 50 actually is bowed such that it is concave upward (i.e., the ends are higher than the middle—similar to a smile). This provides that the main tube 50 is connected to the head pipe 48 with an upwardly extending end of the main tube 50. Advantageously, such an arrangement enhances the vertical compliance of the frame assembly 12 by encouraging the main tube 50 to flex in response to a load being applied at the forward end of the main tube 50, i.e., through the head pipe 48.

Although the present invention has been described in the context of a preferred embodiment, it is not intended to limit the invention to the provided example. Modifications to the above-described frame assembly apparent to one of skill in the art are considered to be part of the present invention. Accordingly, the invention should be defined solely by the appended claims.

What is claimed is:

1. An off-road motorcycle comprising a frame assembly, the frame assembly including a head pipe, a main tube and a down tube, the main tube and the down tube extending in a generally rearward direction from the head pipe, the main tube being positioned above the down tube, a front suspension assembly rotatably supported by the head pipe and rotatably supporting a front wheel, a rear suspension assembly pivotably supported by the frame assembly and rotatably supporting a rear wheel, an internal combustion engine supported by said frame assembly and being configured to drive the rear wheel, the main tube defining a first cross-sectional dimension in a first direction substantially aligned with a vertical center plane of the motorcycle and a second cross-sectional dimension in a second direction substantially normal to the first direction, the second dimension being greater than the first dimension, the main tube being nonlinear along its length and defining a center line extending through the main tube from a forward end of the main tube to a rearward end of the main tube, a center portion of the center line being spaced below a straight line extending between the forward end and the rearward end of the axis.

2. The off-road motorcycle of claim 1, wherein the head pipe defines a center axis, the center line of the main tube intersecting the center axis of the head pipe at an intersection point, the main tube extending from the head pipe such that the center line of the main tube is inclined in a downward direction with respect to a line passing through the intersection point and being normal to the axis of the head pipe.

3. The off-road motorcycle of claim 1, additionally comprising a reinforcement bracket attached to a center portion of the main tube and extending along a portion of the length of the main tube.

4. The off-road motorcycle of claim 3, wherein the reinforcement bracket is positioned on an upper surface of the main tube.

5. The off-road motorcycle of claim 3, wherein the reinforcement bracket includes a cut-out portion extending from an end of the reinforcement bracket and being generally aligned with the center axis of the main tube.

6. The off-road motorcycle of claim 1, additionally comprising a seat pillar extending between the down tube and the main tube, a lug connecting a rearward end of the main tube to an upper end of the seat pillar, the lug having an upper lug portion secured to a lower lug portion and securing the rearward end and the upper end therebetween.

7. The off-road motorcycle of claim 6, the lug having a cut-out portion extending from a forward end of the lug and generally aligned with the center axis of the main tube.

8. The off-road motorcycle of claim 7, wherein the cut-out portion extends beyond a rearward end of the main tube.

9. A motorcycle frame assembly comprising a head pipe, a main tube and a down tube, the main tube and the down tube extending in a generally rearward direction from the head pipe, the main tube being positioned above the down tube, the main tube defining a first cross-sectional dimension in a longitudinal vertical plane of the motorcycle and a second cross-sectional dimension in a second direction substantially normal to the first direction, the second dimension being greater than the first dimension, and the main tube having a noncircular continuously curved cross-section along at least a portion of the main tube, wherein the portion having the noncircular continuously curved cross-section is bowed downward relative to a straight line extending orthogonal to a center axis of the head pipe.

10. The motorcycle frame of claim 9, wherein the head pipe comprises a center axis, the main tube comprises a center line that intersects the center axis of the head pipe at an intersection point, the main tube extending from the head pipe such that the center line of the main tube slopes in a downward and rearward direction with respect to an imaginary transverse plane passing through the intersection point and being normal to the axis of the head pipe.

11. The motorcycle frame of claim 9, additionally comprising a reinforcement bracket attached to a center portion of the main tube and extending along a portion of the length of the main tube.

12. The motorcycle frame of claim 9 further comprising a reinforcement bracket attached to the portion having the noncircular continuously curved cross-section.

13. The motorcycle frame of claim 9, wherein a forward end of the main tube is connected to the head pipe and the forward end of the main tube extends to the head pipe in an upward direction such that an angle is defined between a line extending orthogonally away from the head pipe axis and a transverse centerplane extending though the main tube.

* * * * *